United States Patent
Dotan et al.

(10) Patent No.: US 9,514,407 B1
(45) Date of Patent: Dec. 6, 2016

(54) QUESTION GENERATION IN KNOWLEDGE-BASED AUTHENTICATION FROM ACTIVITY LOGS

(71) Applicant: EMC Corporation, Hopkinton, MA (US)

(72) Inventors: Yedidya Dotan, Newton, MA (US); Ayelet Levin, Newton, MA (US); Ayelet Avni, Binyamina (IL); Ayelet Eliezer, Givatyim (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 403 days.

(21) Appl. No.: 13/628,630

(22) Filed: Sep. 27, 2012

(51) Int. Cl.
*G06F 17/00* (2006.01)
*G06N 5/02* (2006.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | | |
|---|---|---|---|---|
| 7,231,657 B2 * | 6/2007 | Honarvar | G06Q 10/10 | 709/225 |
| 7,234,156 B2 * | 6/2007 | French | G06F 21/31 | 726/2 |
| 7,260,724 B1 * | 8/2007 | Dickinson | H04L 63/08 | 713/182 |
| 7,286,158 B1 * | 10/2007 | Griebenow | G07C 9/00103 | 340/505 |
| 7,673,340 B1 * | 3/2010 | Cohen | G06F 11/3438 | 379/266.08 |
| 8,250,632 B1 * | 8/2012 | Staddon | G06F 17/30867 | 705/319 |
| 8,255,452 B2 * | 8/2012 | Piliouras | G06F 21/41 | 705/14.14 |
| 8,255,949 B1 * | 8/2012 | Bayer | G06Q 30/0241 | 725/32 |
| 8,353,012 B2 * | 1/2013 | Del Real | G06F 21/6218 | 705/326 |
| 8,412,938 B2 * | 4/2013 | Farrugia | H04L 9/321 | 713/168 |
| 8,776,195 B1 * | 7/2014 | Avni | G06F 21/30 | 707/634 |
| 8,850,537 B1 * | 9/2014 | Dotan | H04L 63/08 | 726/6 |
| 8,955,066 B1 * | 2/2015 | Ackerman | G06F 21/316 | 726/5 |

(Continued)

FOREIGN PATENT DOCUMENTS

WO    WO 2008026412 A1 *   3/2008    ............. G06F 21/31

OTHER PUBLICATIONS

WO 2008026412 A1 Machine Translation, Oct. 2014.*

(Continued)

*Primary Examiner* — Kakali Chaki
*Assistant Examiner* — Fuming Wu
(74) *Attorney, Agent, or Firm* — BainwoodHuang

(57) ABSTRACT

An improved technique involves generating KBA questions based on facts from fact sources pointed to by an activity log. A KBA system obtains an activity log from a computer of a user in an organization. For example, the computer records the user's web browsing history. The KBA system then considers each entry in the activity log as a source of facts for deriving KBA questions. In the case of a web browsing history, the KBA system generates facts from web pages that the user visited. The KBA system then derives new KBA questions from the facts so derived.

19 Claims, 4 Drawing Sheets

(56) References Cited

U.S. PATENT DOCUMENTS

| | | | | |
|---|---|---|---|---|
| 2003/0154406 | A1* | 8/2003 | Honarvar | G06Q 10/10 726/10 |
| 2004/0005051 | A1* | 1/2004 | Wheeler | H04L 9/3231 380/28 |
| 2006/0015450 | A1* | 1/2006 | Guck | G06Q 20/10 705/39 |
| 2006/0022048 | A1* | 2/2006 | Johnson | H04L 69/329 235/462.1 |
| 2006/0064037 | A1* | 3/2006 | Shalon | A61B 5/0006 600/586 |
| 2007/0094711 | A1* | 4/2007 | Corley | G06F 21/53 726/3 |
| 2008/0040303 | A1* | 2/2008 | Fogelson | G06Q 30/02 706/26 |
| 2009/0031006 | A1* | 1/2009 | Johnson | H04W 76/021 709/218 |
| 2009/0305670 | A1* | 12/2009 | DeBoer | G06Q 20/32 455/411 |
| 2010/0031039 | A1* | 2/2010 | Ciet | H04L 9/001 713/168 |
| 2010/0122329 | A1* | 5/2010 | Jakobsson | G06F 21/316 726/6 |
| 2010/0138037 | A1* | 6/2010 | Adelberg | G06Q 10/087 700/241 |
| 2010/0162365 | A1* | 6/2010 | Del Real | G06F 21/6218 726/4 |
| 2012/0030251 | A1* | 2/2012 | Alfredson | G06Q 10/103 707/803 |
| 2012/0079576 | A1* | 3/2012 | Han | G06F 21/316 726/7 |
| 2012/0185349 | A1* | 7/2012 | Soroca | G06Q 30/08 705/26.3 |
| 2012/0209708 | A1* | 8/2012 | Ramer | G06F 17/30867 705/14.51 |
| 2012/0310702 | A1* | 12/2012 | Paulsen | H04L 63/0815 705/7.29 |
| 2013/0191904 | A1* | 7/2013 | Piliouras | H04L 63/12 726/7 |
| 2013/0198815 | A1* | 8/2013 | Piliouras | H04L 63/10 726/4 |
| 2013/0226698 | A1* | 8/2013 | Cochinwala | G06Q 30/06 705/14.53 |

OTHER PUBLICATIONS

MachineTranslation-WO2008026412A1, 2008.*
Amin Jamalzadeh, "Analysis of Clickstream Data" PhD Thesis, Durham University, Oct. 2011.*
MachineTranslation-WO2008026412A 1, 2008.*
Juels, et. al., "Cache Cookies for Browser Authentication (Extended Abstract)," Proceedings of the 2006 IEEE Symposium on Security and Privacy (S&P'06), 5 pages, 2006.*
Weinberg, et. al., "I Still Know What You Visited Last Summer," 2011 IEEE Symposium on Security and Privacy, pp. 147-161, 2011.*

* cited by examiner

QUESTION GENERATION IN KNOWLEDGE-BASED AUTHENTICATION FROM ACTIVITY LOGS

BACKGROUND

Conventional knowledge-based authentication (KBA) involves deriving questions regarding a particular user from facts in a publicly available database, and asking that user one or more of the derived questions to verify the authenticity of the user. For example, conventional KBA accesses facts such as addresses, mortgage payments, and driving records from a LexisNexis® server, a credit bureau or a motor vehicle registry.

Suppose that a user wishes to make a purchase at a store using a store account. In conventional KBA, the store may ask the user a set of questions derived from a set of facts concerning the user in order to complete the purchase. Such questions may include "when were you married?", "what was the make and model of your first car?", and "what was the name of your first pet?". If the user answers the questions correctly, the store completes the purchase. On the other hand, if the user answers questions incorrectly, the store may take remedial steps to verify the authenticity of the user. For example, the store may ask for further proof of identity such as a driver's license.

SUMMARY

Unfortunately, there are deficiencies with the above-described conventional KBA. For example, hackers that get access to facts are able to answer KBA questions based on those facts. Along these lines, consider that conventional KBA accesses facts from a LexisNexis® server, a credit bureau or a motor vehicle registry to create KBA questions. Such a hacker may breach the security of such servers and thereby gain access to the information needed for generating KBA questions. In such a scenario, the security such conventional KBA provides comes into question.

Further, fact sources are limited, typically to publicly available databases such as those discussed above. Consequently, even in a scenario where such publicly available databases are secure, the number of original KBA questions becomes limited by the lack of diversity of fact sources. In this way, the security such KBA provides may be compromised by repeat questions resulting from the limited number of unique facts.

In contrast to the above-described conventional KBA in which security may be compromised due to a hacker gaining access to one of the few fact sources available, an improved technique involves generating KBA questions based on facts from fact sources pointed to by an activity log. A KBA system obtains an activity log from a computer of a user in an organization. For example, the computer records the user's web browsing history. The KBA system then considers each entry in the activity log as a source of facts for deriving KBA questions. In the case of a web browsing history, the KBA system generates facts from web pages that the user visited. The KBA system then derives new KBA questions from the facts so derived.

Advantageously, the improved technique allows for confidence in KBA questions to be maintained in the event of a hacker gaining access to a fact server. Because the improved technique involves obtaining facts from sources as diverse as the web pages a user has visited, the compromise of one server does not imply that the hacker will be able to answer even a small fraction of KBA questions generated from such facts. Further, because the improved technique generates questions from a diverse set of fact sources, there is very little risk of repeating KBA questions.

One embodiment of the improved technique is directed to a method of generating KBA questions. The method includes obtaining an activity log of a user, the activity log including pointers to a set of external fact sources. The method also includes deriving external facts from each external fact source of the set of external fact sources. The method further includes generating a set of KBA questions from the external facts, the set of KBA questions being provided in response to a request to authenticate as the user.

Additionally, some embodiments of the improved technique are directed to a system constructed and arranged to generate KBA questions. The system includes a network interface, memory, and a controller including controlling circuitry constructed and arranged to carry out the method of generating KBA questions.

Furthermore, some embodiments of the improved technique are directed to a computer program product having a non-transitory computer readable storage medium which stores code including a set of instructions to carry the method of generating KBA questions.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves generating KBA questions based on facts from fact sources pointed to by an activity log. A KBA system obtains an activity log from a computer of a user in an organization. For example, the computer records the user's web browsing history. The KBA system then considers each entry in the activity log as a source of facts for deriving KBA questions. In the case of a web browsing history, the KBA system generates facts from web pages that the user visited. The KBA system then derives new KBA questions from the facts so derived.

Advantageously, the improved technique allows for confidence in KBA questions to be maintained in the event of a hacker gaining access to a fact server. Because the improved technique involves obtaining facts from sources as diverse as the web pages a user has visited, the compromise of one server does not imply that the hacker will be able to answer even a small fraction of KBA questions generated from such facts. Further, because the improved technique generates questions from a diverse set of fact sources, there is very little risk of repeating KBA questions.

Figure 1:
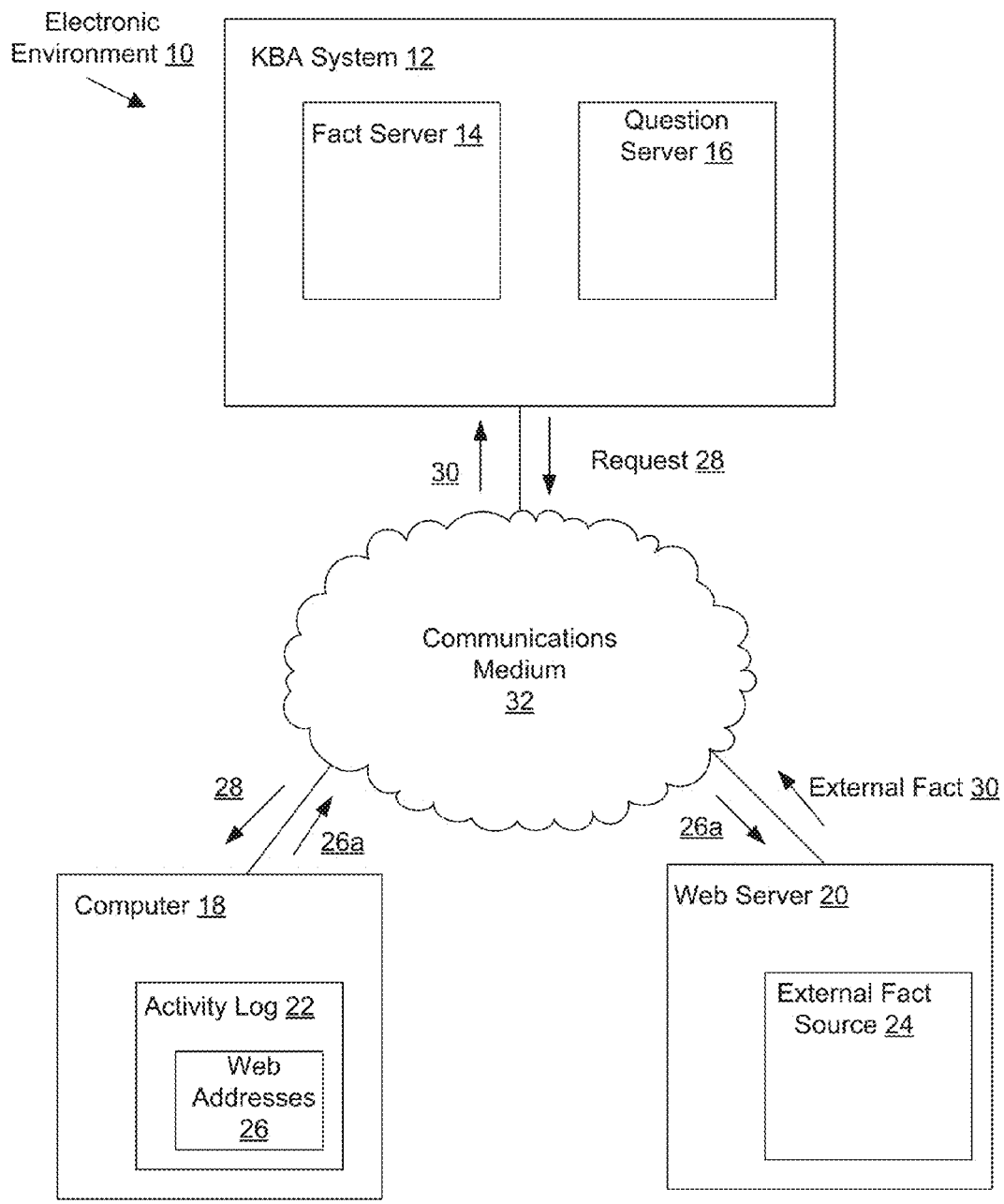
FIG. 1 is a block diagram illustrating an example electronic environment for carrying out the improved technique.

FIG. 1 illustrates an example electronic environment 10 for carrying out the improved technique. Electronic environment 10 includes KBA system 12, computer 18, web server 20, and communications medium 32.

Communication medium 32 provides network connections between KBA system 12, computer 18, and web server 20. Communications medium 32 may implement a variety of protocols such as TCP/IP, UDP, ATM, Ethernet, Fibre Channel, combinations thereof, and the like. Furthermore, communications media 32 may include various components (e.g., cables, switches/routers, gateways/bridges, NAS/SAN appliances/nodes, interfaces, etc.). Moreover, the communications medium 32 are capable of having a variety of topologies (e.g., queue manager-and-spoke, ring, backbone, multi drop, point to-point, irregular, combinations thereof, and so on).

KBA system 12 is an electronic system that is constructed and arranged to generate facts used to produce KBA questions from external fact sources such as web server 20. KBA system 12 includes a fact server 14 and a question server 16.

Fact server 14 is an electronic system in communication with question server 16. Fact server 14 is constructed and arranged to access activity log 22 on computer 18. For example, activity log 22 may include a set of web addresses 26 that a user of computer 18 had visited. Fact server 14 is also constructed and arranged to access an external fact source 24 on web server 20 to which activity log 22 points. Fact server 14 is further constructed and arranged to produce and store facts from information extracted from web server 20.

Question server 16 is an electronic system in communication with fact server 14. Question server 16 is constructed and arranged to generate and store KBA questions derived from facts produced by fact server 14.

Computer 18 in example electronic environment 10 is a desktop personal computer having a network connection to communications medium 32. In some arrangements, computer 18 may be a laptop computer, a netbook, a tablet computer, a smartphone, or a personal digital assistant. Computer 18 is constructed and arranged to store activity log 22 and add entries to activity log 22 in response to a user performing certain activities on computer 18. For example, computer 18 adds an entry to activity log 22 in response to the user visiting a web site hosted by web server 20. Such an entry is part of a set of web addresses 26 stored within activity log 22.

Web server 20 in example electronic environment 10 is an electronic apparatus constructed and arranged to host a web site that is accessible to computer 18 over communications medium 32. For example, the web site hosted by web server contains information that fact server 14 construes as external fact source 24.

During operation, computer 18 registers with KBA system 12. For example, computer 18 may be a part of a network of a corporation that controls KBA system 12. In registering with KBA system 12, computer 18 grants KBA system 12 access to activity log 22.

After computer 18 registers with KBA system 12, fact server 14 sends a request 28 to access activity log 22 over communications medium 32. In some arrangements, fact server 14 sends request 28 to access activity log 22 periodically, e.g., nightly. In other arrangements, however, fact server 14 sends request 28 to access activity log 22 in response to an event, e.g., a detected breach of security on fact server 14.

It should be understood that, by accessing activity log 22, fact server 14 reads entries of activity log 22 for the purpose of finding potential sources of facts. It should be understood that at least one entry of activity log 22 contains a pointer to an address of web server 20 (e.g., IP address, web address, etc.). For example, suppose that activity log 22 contains web addresses 26 of web sites visited by a user over a certain recent time period. Fact server 14 then stores these web addresses in memory 46 (see FIG. 2) in order to retrieve information on web sites located at the web addresses.

Once fact server 14 reads the entries of activity log 22, fact server 14 access web server 20 at a particular web address 26a in order to use web server 20 as an external fact source 24. For example, if web server hosts a website that contains information about automotive sales, external fact source 24 may contain facts about automobile makes and models and prices that the cars are being offered for sale.

It should be understood that, in using web server 20 as external fact source 24, fact server 14 parses a web site hosted by web server 20 for information that may be used as facts. For example, fact server 14 searches such a website for keywords such as names, dollar figures, dates, and times. In a scenario such as the website about automotive sales, fact server 14 parses make and model names and dollar amounts that represent sale prices. A sample fact 30 derived from such parsing may be "a 2002 Honda Civic costs $7,300." Fact server 14 then stores facts 30 from fact source in fact database 58 (see FIG. 2).

Question server 16 generates KBA questions from facts 30 stored in fact database 58. In some arrangements, question server 16 generates KBA questions when question server 16 detects at least a certain number of new facts being stored in fact database 58. In other arrangements, question server 16 generates KBA questions periodically, e.g., nightly.

Further details about KBA system 12 are described below with respect to FIG. 2.

Figure 2:
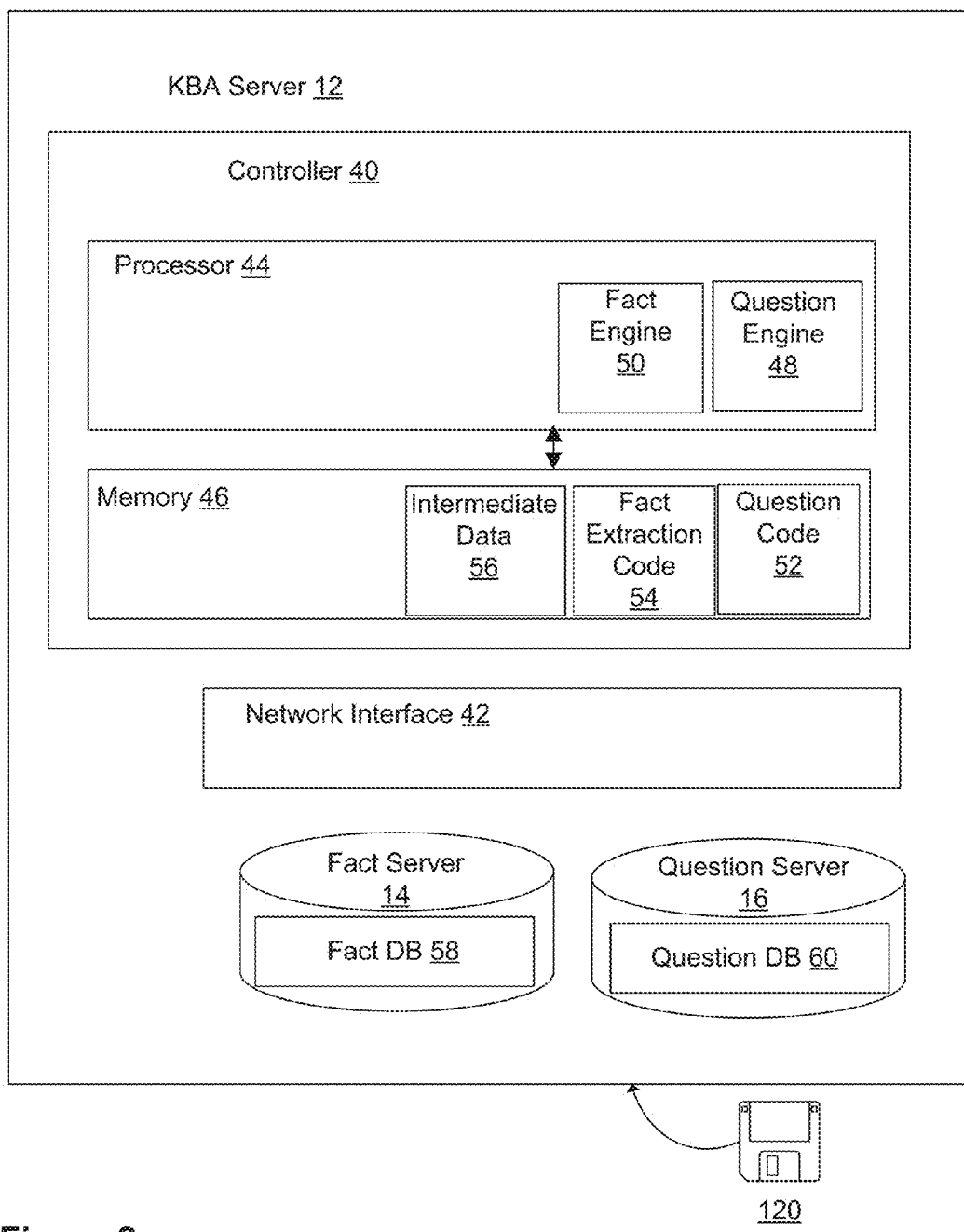
FIG. 2 is a block diagram illustrating an example KBA system within the electronic environment shown in FIG. 1.

FIG. 2 illustrates further details of KBA system 12. KBA system 12 includes controller 40, which in turn includes processor 44 and memory 46; network interface 42; and facts database 58 stored within fact server 14 and question database 60 stored within question server 16.

Network interface 42 takes the form of an Ethernet card; in some arrangements, network interface 42 takes other forms including a wireless receiver and a token ring card.

Memory 46 is configured to store code which includes question code 52 configured to generate a set of KBA questions from facts stored in fact database 58 on fact server 14. KBA questions, in turn, are stored in questions database 60 on question server 16. Memory 50 also includes space for intermediate data 56, in which intermediate results of question building are stored, as well as fact extraction code 54 for extracting facts from web server 20. Memory 50 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 48 is coupled to memory 46 and is configured to execute instructions from question code 52 and fact extraction code 54. Processor 48 includes question engine 48 and fact engine 50.

During operation, processor 44 receives, over network interface 42, an identifier corresponding to computer 18 (not pictured). Computer 18 sends the identifier to processor 44 as a part of the above-described registration process. Upon receiving the identifier, processor 44 stores the identifier in fact database 58 and question database 60.

At some time determined by a flag (not pictured) stored in memory 46, processor 44 sends a request 28 (see FIG. 1) to access activity log 22 (see FIG. 1) to computer 18 via network interface 42. In some arrangements, processor 44 causes fact server 14 to send request 28.

It should be understood that the flag stored in memory 46 causes processor 44 to send request 28 either periodically or in response to an event, as described above. In the former case, processor 44 works in conjunction with a clock (not pictured) to determine when access of activity log 22 should take place.

Upon receiving a response to request 28, processor 44 checks activity log 22 for updates since a previous access of activity log 22. Processor 44 then reads the addresses to which the recent entries point into intermediate data 56 in memory 46. In the case of the addresses being web addresses pointing to a web server 20 (see FIG. 1), processor 44 accesses a web address via a browser (not pictured) on KBA system 12.

Processor 44 accesses information on web server 20 via network interface 42. In some arrangements, the information is textual in nature; in other arrangements, however, the information may contain audio or video (such as that found in audiobooks, movie trailers, music, etc.). Processor 44 stores this information in intermediate data 56.

Fact engine 50 parses the information taken from web server 20 in order to generate facts to be stored on fact database 58. For example, fact engine 50 performs a search operation for particular keywords within textual information to extract facts. Once fact engine 50 parses the information, processor 44 stores the facts extracted from the information on fact database 58. An example of such a fact extraction is described below in further detail with respect to FIG. 3.

Figure 3:
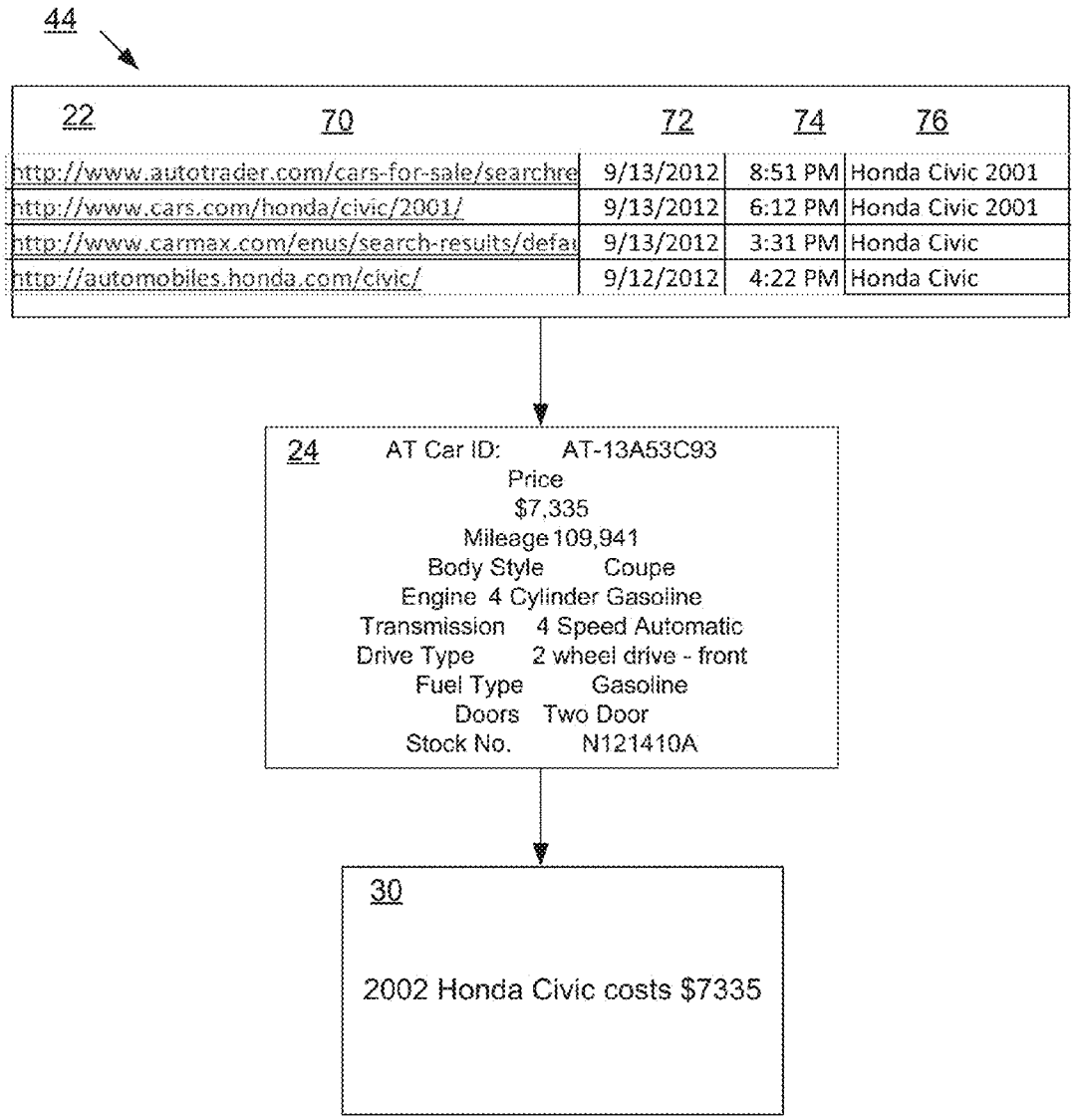
FIG. 3 is a block diagram illustrating an example fact generator within the example KBA system shown in FIG. 2.

FIG. 3 illustrates an example of a conversion of information found on a website by processor 44 to facts stored on fact database 58 (see FIG. 2). In this example, computer 18 (see FIG. 1) includes an activity log 22 with entries pointing to websites of automotive sales. Particularly, the user of computer 18 was searching for information about Honda Civics.

In particular, example activity log 22 shows four websites visited by the user of computer 18 within the space of about a day. These websites are common websites that one shopping for a Honda Civic may visit for information about vendors, pricing, car details etc. Activity log 22 keeps track of what sites 70 were visited, what date 72 they were visited, the time 74 at which they were visited, and search terms 76 used for searching to get to the site.

It should be understood that, as an alternative to choosing those entries of activity log 22 that were updated since a previous access, processor 44 may instead access only those entries of activity log 22 that are no older than a threshold age.

It should also be understood that processor 44 may generate additional fact sources by examining alternative websites using search terms 76. That is, processor 44 may input search terms 76 into a search engine and access alternative websites listed in the search output. In some arrangements, a search engine arranges search output by relevance, and processor 44 only accesses those pages having at least a minimum relevance.

A website hosted by web server 20 (see FIG. 1) becomes external fact source 24 from which fact engine 50 parses text to produce facts. In the example illustrated in FIG. 3, external fact source 24 lists information that fact engine 50 had directly taken from one of the websites listed in activity log 22. In this case, the text includes information related to a particular Honda Civic.

Fact engine 50 (see FIG. 2) searches through the text for particular keywords. In this case, keywords would include a price ($7,335), a make (Honda), a model (Civic), and a year (2002). Fact engine 50 then assembles these pieces into a fact 30 which states that a "2002 Honda Civic costs $7,335" and stores this fact on fact database 58.

Once fact engine 50 has completed the extraction of facts from web servers 20 pointed to by activity log 22, question engine 52 generates KBA questions from facts stored in fact database 58 and stores the KBA questions on question database 60.

It should be understood that, in some arrangements, KBA questions take the form of multiple choice questions having one correct answer and a set of incorrect answers, or confounders. Fact engine 50 may provide facts used to generate such correct answers and confounders in a similar manner as described above. In the case of confounders, fact engine 50 may extract confounders from the same website as that from which it extracts the correct answers; alternatively, fact engine 50 may consult a different website determined by search terms 76.

It should also be understood that KBA system 12 may use questions derived by question engine 52 as pilot questions for feedback. That is, answers to KBA questions provided by users may guide KBA system in determining the whether external fact source 24 provided high-quality questions.

Figure 4:
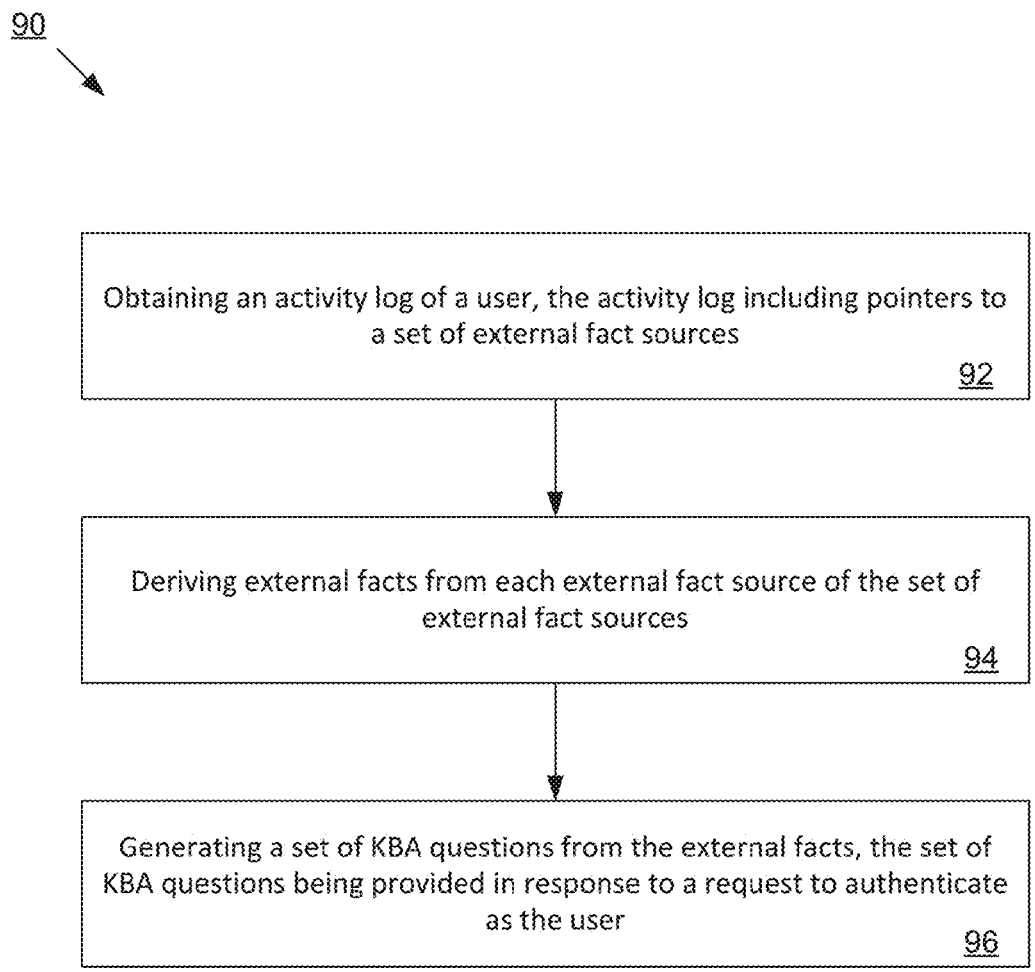
FIG. 4 is a flow chart illustrating a method of carrying out the improved technique within the electronic environment shown in FIG. 1.

FIG. 4 illustrates a method 90 of generating KBA questions. In step 92, an activity log of a user is obtained, the activity log including pointers to a set of external fact sources. In step 94, external facts are derived from each external fact source of the set of external fact sources. In step 96, a set of KBA questions are generated from the external facts, the set of KBA questions being provided in response to a request to authenticate as the user.

While various embodiments of the invention have been particularly shown and described, it will be understood by those skilled in the art that various changes in form and details may be made therein without departing from the spirit and scope of the invention as defined by the appended claims.

For example, as mentioned above, the examples provided in the drawing are directed to text-based information in websites. Nevertheless, an activity log also points to electronic media such as eBooks, music, audiobooks, and videos that a user downloads onto a computer. Fact engine 50 may be configured to extract facts from, e.g., descriptions of such media, or even the media itself.

Furthermore, it should be understood that some embodiments are directed to KBA system 12, which is constructed and arranged to generate KBA questions. Some embodiments are directed to a process of generating KBA questions. Also, some embodiments are directed to a computer program product which enables computer logic to generate KBA questions.

In some arrangements, KBA system 12 is implemented by a set of processors or other types of control/processing circuitry running software. In such arrangements, the software instructions can be delivered, within KBA system 12, respectively (see FIG. 2), in the form of a computer program product 120, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of generating knowledge-based authentication (KBA) questions, the method comprising:
   obtaining, from a user device, an activity log of a user, the activity log including pointers to a set of external fact sources;

deriving external facts from each external fact source of the set of external fact sources; and generating a set of KBA questions from the external facts;

wherein the activity log of the user includes a web browsing history of the user, wherein the pointers to the set of external fact sources include a list of addresses, within the web browsing history, of websites corresponding to the respective addresses and previously visited by the user, the set of external fact sources including the websites addressed by the list of addresses, wherein deriving the set of external facts includes accessing, over a network, each of the websites addressed by the list of addresses and acquiring the external facts from the websites, and wherein the KBA questions are generated by a KBA server from content of websites distinct from the user device, pointed to by the web browsing history on the user device, and visited by the KBA server connecting to the websites over the network.

2. A method as in claim 1, wherein each address of the list of addresses includes metadata indicating a time at which the user visited the website to which the address corresponds;

wherein acquiring the web browsing history includes:
for each address of the list of addresses of the web browsing history:
selecting the address when the metadata indicates that the user visited the website to which the address corresponds later than a threshold time, and
not selecting the address when the metadata indicates that the user visited the website to which the address corresponds earlier than the threshold time.

3. A method as in claim 2, wherein the metadata further indicates a set of keywords used to make a search engine aware of the website when keywords of the set of keywords are entered into the search engine;

wherein acquiring the web browsing history further includes:
inputting a keyword of the set of keywords into the search engine;
after inputting the keyword into the search engine, obtaining addresses of an alternate website that was listed as output of the search engine;

wherein deriving the external facts includes:
deriving facts from the alternate website.

4. A method as in claim 1, wherein deriving the external facts includes:
for each address of the list of addresses:
navigating a browser to access a document on the website to which the address corresponds, and
extracting external facts from the document.

5. A method as in claim 4, wherein the document on the website to which the address corresponds includes textual reference material; and wherein extracting the external facts from the document includes:
performing a parsing operation on the textual reference material of the document, the parsing operation being constructed and arranged to produce a parsing result; and
obtaining the external facts from the parsing result.

6. A method as in claim 5, wherein the parsing result includes a set of chosen sentences extracted from the textual reference material, each chosen sentence of the set of chosen sentences including an external fact; and wherein performing the parsing operation includes:
separating the document into a group of sentences, and
assigning a sentence of the group of sentences to be a chosen sentence of the set of chosen sentences when the sentence includes a keyword of a specified set of keywords.

7. A method as in claim 1, wherein the KBA questions of the set of KBA questions are multiple-choice questions having a correct choice and a set of confounders;

wherein generating the set of KBA questions from the external facts includes:
producing the correct choice from the external facts, and
producing the set of confounders from the external facts and a set of alternate facts, the set of alternate facts being derived from a specified set of addresses, each address of the specified set of addresses corresponding to a specified website.

8. A method as in claim 1, wherein the set of KBA questions includes a pilot question derived from specific external facts from a specific external fact source of the set of external fact source, the specific external fact source being pointed to by a specific pointer of the activity log; and wherein the method further comprises:
providing the pilot question to a user that has requested authentication;
receiving an answer to the pilot question; and
based on the answer to the pilot question, evaluating a suitability of the specific external fact source as a source of external facts for generating KBA questions.

9. A method as in claim 1, wherein the activity log includes a search term input into a first search engine by the user to find a website visited by the user; and wherein the method further comprises:
inputting the search term into a second search engine, the second search engine outputting a second list of addresses,
accessing an alternative website corresponding to an address of the second list of addresses,
extracting an alternative fact from the alternative website based on the search term, and
generating a KBA question based on the alternative fact.

10. A method as in claim 1, further comprising performing an authentication operation in response to a person attempting to authenticate as the user by challenging the user with at least one of the KBA questions generated by the KBA server from the content of the websites pointed to by the web browsing history on the user device.

11. A system constructed and arranged to generate knowledge-based authentication (KBA) questions, the system comprising:
a network interface;
memory; and
a controller including controlling circuitry coupled to the memory, the controlling circuitry being constructed and arranged to:
obtain, from a user device, an activity log of a user, the activity log including pointers to a set of external fact sources;

derive external facts from each external fact source of the set of external fact sources; and
generate a set of KBA questions from the external facts,
wherein the activity log of the user includes a web browsing history of the user,
wherein the pointers to the set of external fact sources include a list of addresses, within the web browsing history, of websites corresponding to the respective addresses and previously visited by the user, the set of external fact sources including the websites addressed by the list of addresses,
wherein controlling circuitry constructed and arranged to derive the set of external facts is further constructed and arranged to access, over a network, each of the websites addressed by the list of addresses and acquiring the external facts from the websites, and
wherein the KBA questions are generated by a KBA server from content of websites distinct from the user device, pointed to by the web browsing history on the user device, and visited by the KBA server connecting to the websites over the network.

12. A system as in claim 11,
wherein each address of the list of addresses includes metadata indicating a time at which the user visited the website to which the address corresponds;
wherein the controlling circuitry constructed and arranged to acquire the web browsing history is further constructed and arranged to:
  for each address of the list of addresses of the web browsing history:
    select the address when the metadata indicates that the user visited the website to which the address corresponds later than a threshold time, and
    not select the address when the metadata indicates that the user visited the website to which the address corresponds earlier than the threshold time.

13. A system as in claim 12,
wherein the metadata further indicates a set of keywords used to make a search engine aware of the website when keywords of the set of keywords are entered into the search engine;
wherein the controlling circuitry constructed and arranged to acquire the web browsing history is further constructed and arranged to:
  input a keyword of the set of keywords into the search engine;
  after inputting the keyword into the search engine, obtain addresses of an alternate website that was listed as output of the search engine;
wherein the controlling circuitry constructed and arranged to derive the external facts is further constructed and arranged to:
  derive facts from the alternate website.

14. A system as in claim 11,
wherein the controlling circuitry constructed and arranged to access the website is further constructed and arranged to:
  for each address of the list of addresses:
    navigate a browser to access a document on the website to which the address corresponds, and
    extract external facts from the document.

15. A system as in claim 14,
wherein the document on the website to which the address corresponds includes textual reference material; and
wherein the controlling circuitry constructed and arranged to extract the external facts from the document is further constructed and arranged to:
  perform a parsing operation on the textual reference material of the document, the parsing operation being constructed and arranged to produce a parsing result; and
  obtain the external facts from the parsing result.

16. A system as in claim 15,
wherein the parsing result includes a set of chosen sentences extracted from the textual reference material, each chosen sentence of the set of chosen sentences including an external fact; and
wherein the controlling circuitry constructed and arranged to perform the parsing operation is further constructed and arranged to:
  separate the document into a group of sentences, and
  assign a sentence of the group of sentences to be a chosen sentence of the set of chosen sentences when the sentence includes a keyword of a specified set of keywords.

17. A computer program product having a non-transitory, computer-readable storage medium which stores code to perform a method of generating knowledge-based authentication (KBA) questions, the method comprising:
  obtaining, from a user device, an activity log of a user, the activity log including pointers to a set of external fact sources;
  deriving external facts from each external fact source of the set of external fact sources; and
  generating a set of KBA questions from the external facts;
wherein the activity log of the user includes a web browsing history of the user,
wherein the pointers to the set of external fact sources include a list of addresses, within the web browsing history, of websites corresponding to the respective addresses and previously visited by the user, the set of external fact sources including the websites addressed by the list of addresses,
wherein deriving the set of external facts includes accessing, over a network, each of the websites addressed by the list of addresses and acquiring the external facts from the websites, and
wherein the KBA questions are generated by a KBA server from content of websites distinct from the user device, pointed to by the web browsing history on the user device, and visited by the KBA server connecting to the websites over the network.

18. A computer program product as in claim 17,
wherein each address of the list of addresses includes metadata indicating a time at which the user visited the website to which the address corresponds;
wherein acquiring the web browsing history includes:
  for each address of the list of addresses of the web browsing history:
    selecting the address when the metadata indicates that the user visited the website to which the address corresponds later than a threshold time, and
    not selecting the address when the metadata indicates that the user visited the website to which the address corresponds earlier than the threshold time.

19. A computer program product as in claim 18,
wherein the metadata further indicates a set of keywords used to make a search engine aware of the website when keywords of the set of keywords are entered into the search engine;
wherein acquiring the web browsing history further includes:
- inputting a keyword of the set of keywords into the search engine;
- after inputting the keyword into the search engine, obtaining addresses of an alternate website that was listed as output of the search engine;

wherein deriving the external facts includes:
- deriving facts from the alternate website.

* * * * *